US008018830B2

(12) United States Patent
Hofmann

(10) Patent No.: US 8,018,830 B2
(45) Date of Patent: Sep. 13, 2011

(54) TRANSMISSION OF A DATA STREAM USING OFDM SYMBOLS AT TWO CARRIER FREQUENCIES HAVING OVERLAPPING SUPERFRAMES OF A COMMENSURABLE TIME DURATION

(75) Inventor: Frank Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 12/067,480

(22) PCT Filed: Aug. 10, 2006

(86) PCT No.: PCT/EP2006/065232
§ 371 (c)(1), (2), (4) Date: Jun. 11, 2008

(87) PCT Pub. No.: WO2007/033866
PCT Pub. Date: Mar. 29, 2007

(65) Prior Publication Data
US 2009/0141697 A1 Jun. 4, 2009

(30) Foreign Application Priority Data
Sep. 20, 2005 (DE) ......................... 10 2005 044 970

(51) Int. Cl.
*H04J 11/00* (2006.01)
*H04W 4/00* (2009.01)

(52) U.S. Cl. ......................... 370/206; 370/329; 370/341

(58) Field of Classification Search ......................... None
See application file for complete search history.

(56) References Cited

U.S. PATENT DOCUMENTS 6,522,866 B1 * 2/2003 Merkle et al. ................... 455/59
7,339,882 B2 * 3/2008 Schaefer et al. ............. 370/203
7,639,752 B2 * 12/2009 Demoulin et al. ............ 375/267
7,778,336 B1 * 8/2010 Toumpakaris et al. ........ 375/260
7,809,342 B2 * 10/2010 Wang ......................... 455/158.4
2004/0146003 A1 * 7/2004 Schaefer et al. .............. 370/206
(Continued)

FOREIGN PATENT DOCUMENTS

DE 100 60 569 6/2002
(Continued)

OTHER PUBLICATIONS

International Search Report, PCT International Patent Application No. PCT/EP2006/065232, dated Feb. 23, 2007.

(Continued)

*Primary Examiner* — Chi H Pham
*Assistant Examiner* — Soon-Dong D Hyun
(74) *Attorney, Agent, or Firm* — Kenyon & Kenyon LLP

(57) ABSTRACT

In a method for transmitting a data stream in a digital transmission system, the data stream is transmitted in a transmitted signal using successive OFDM symbols;

a number of OFDM symbols are combined in a transmission frame;

a number of transmission frames are transmitted in one transmission superframe;

each transmission superframe has an information block having one or more OFDM symbols in an established position of the transmission superframe;

a first transmitted signal having a first data stream in a first carrier frequency range and a second transmitted signal having a second data stream having the same information content as the first data stream are transmitted in a second carrier frequency range; and the time duration of the transmission superframes of the first transmitted signal is an integer multiple of the time duration of the transmission superframes of the second transmitted signal.

12 Claims, 4 Drawing Sheets

U.S. PATENT DOCUMENTS

| | | | | |
|---|---|---|---|---|
| 2005/0008034 | A1 | 1/2005 | Merkle et al. | |
| 2005/0036564 | A1 * | 2/2005 | Peter et al. | 375/260 |
| 2005/0262419 | A1 * | 11/2005 | Becker et al. | 714/758 |

FOREIGN PATENT DOCUMENTS

| | | |
|---|---|---|
| EP | 0 994 586 | 4/2000 |
| EP | 1 050 984 | 11/2000 |
| EP | 1 067 719 | 1/2001 |
| GB | 2 372 181 | 8/2002 |
| JP | 2002-208905 | 7/2002 |

OTHER PUBLICATIONS

Hoffman et al., "Digital Radio Mondiale (DRM) Digital Sound Broadcasting in the AM Bands". IEEE Transactions on Broadcasting, vol. 49, No. 3, Sep. 2003, pp. 319-328.

Digital Radio Mondiale (DRM): System Specification, ETSI ES 201 980, C2.2.1 (Oct. 2005) 184 pages.

* cited by examiner

A)

B)

TRANSMISSION OF A DATA STREAM USING OFDM SYMBOLS AT TWO CARRIER FREQUENCIES HAVING OVERLAPPING SUPERFRAMES OF A COMMENSURABLE TIME DURATION

FIELD OF THE INVENTION

The present invention relates to a method for transmitting data in a digital transmission system, in particular, in a DRM transmission system (DRM: digital radio mondiale). The present invention also relates to a method for switching reception between two received signals at two different carrier frequencies in a digital transmission system. The present invention furthermore relates to a reception device in a digital transmission system, as well as a transmitting device for transmitting data in a digital transmission system.

BACKGROUND INFORMATION

The digital transmission system Digital Radio Mondiale (DRM System) was developed for frequency bands below 30 MHz by a worldwide consortium, and was standardized in the year 2001 (ETSI TS 101980). The DRM system was designed by transmission technology and from transmission parameters especially for long wave, middle wave and short wave. Meanwhile, attempts are being made for a broadening of the system to include the VHF band. However, since propagation properties in this broadened frequency band differ substantially from those of the usual frequency bands, the system has to be broadened for effective transmission.

In the DRM transmission system, an important feature is alternative frequency switching. By alternative frequency switching is understood the switching of a transmitted signal at a first carrier frequency to a send signal at a second carrier frequency. Such a switching is carried out, for example, when reception quality is deteriorating on the first carrier frequency or is low, and a program of the same information content is being transmitted on an additional carrier frequency. Such a procedure is also known in connection with the usual analog broadcasting as FM-RDS.

Since a single receiver system is usually involved in the DRM system which is only able to receive and decode one transmitted signal at one carrier frequency at one point in time, one problem is switching between carrier frequencies in such a way that, for instance, in radio reception, no audible interference of the output signal occurs, or rather, that the transmitted data stream is received essentially completely.

As transmission method, the DRM system utilizes OFDM (orthogonal frequency division multiplexing), which is known from the related art. The transmission of the data takes place with the aid of successively sent OFDM symbols. In adapting the DRM system to broadened carrier frequencies, it is meaningful to select the OFDM symbol duration different, based on other channel properties. Therefore, in order to broaden the DRM system to carrier frequencies in a wider transmission band, new OFDM parameters thus have to be established. In the case of higher carrier frequencies, such as in the VHF band, the symbol duration, for example, should be selected to be substantially shorter. As a result, a larger number of OFDM symbols is sent in a certain time period.

In order to be able to decode the OFDM symbols, a renewed channel estimate is necessary when switching to such a further carrier frequency, since the channel estimate cannot be continued on the carrier frequency of the transmitted signal, and there is not yet present a current channel estimate for the send signal on the further carrier frequency to which switching is taking place.

SUMMARY

Example embodiments of the present invention provide a method for transmitting data in a digital transmission system which makes it possible to carry out on the receiving side a switching between two carrier frequencies that is not perceivable, or rather, is complete. Example embodiments of the present invention provide a method for switching reception between two received signals in a digital transmission system. Example embodiments of the present invention provide a reception device for a digital transmission system by which switching of reception can be carried out between transmitted signals. Example embodiments of the present invention provide a transmitting device that makes it possible, on the receiving side, to carry out a switching over that is as imperceptible or gapless as possible when switching between the reception of two transmitted signals at different carrier frequencies.

According to example embodiments of the present invention, a method is provided for transmitting a data stream in a digital transmission system. The data stream is transmitted in a transmitted signal having successive OFDM symbols, a number of OFDM symbols being combined in a transmission frame. A number of transmission frames is transmitted in a transmission superframe, each transmission superframe having an information block having one or more OFDM symbols in an established position of the respective transmission superframe; a first transmitted signal having a first data stream in a first carrier frequency range and a second transmitted signal having a second data stream having the same information content being transmitted in a second carrier frequency range. The time duration of the transmission superframes of the first transmitted signal is a whole-numbered multiple of the time duration of the transmission superframes of the second transmitted signal.

During switching between the reception of transmitted signals on various carrier frequencies, the method according to the present invention makes it possible for no interruption, as far as possible, to occur in the transmitted data stream.

The information block of the transmission superframes of the first transmitted signal is preferably transmitted at least partially overlapping in time with one of the information blocks of the transmission superframes of the second transmitted signal. This makes possible switching over the reception between the transmitted signals during the information block.

According to an example embodiment, a transmitted information is added to at least one of the information blocks of the transmission superframes of the second transmitted signal, which indicates at which information blocks of the second transmitted signal an information block of the first transmitted signal is being transmitted with an overlap in time.

According to an example embodiment, pilot signals are able to be provided in the first and in the second transmission superframes, for supporting a channel estimate, the second carrier frequency being higher than the first carrier frequency; and for carrying out the channel estimate, determined densities of the pilot signals being required in the transmitted signals in the transmission superframes, as a function of channel properties of the transmitted signals; the density of the pilot signals of the second transmitted signal being selected to be higher than the determined density of the pilot signals in the transmission superframes of the second transmitted signal.

According example embodiments of the present invention, a method is provided for switching the reception between two received signals, the received signals including OFDM symbols; a number of OFDM symbols being combined in a transmission frame; a number of transmission frames being transmitted in one transmission superframe. Each transmission superframe has an information block having one or more OFDM symbols in an established position of the transmission superframe, switching between the reception of a first of the received signals and the reception of a second of the received signals taking place during a time period in which the information block is transmitted both in the first and in the second received signal.

According to example embodiments of the present invention, a reception device is provided in a digital transmission system for receiving a received signal. The reception device includes a reception unit for optionally receiving a first received signal in a first carrier frequency range and a second received signal in a second carrier frequency range. The received signals include OFDM symbols, in each case, a number of OFDM symbols being combined in one transmission frame; a number of transmission frames being contained in one transmission superframe. Each transmission superframe has an information block having one or more OFDM symbols in an established position of the transmission superframe. The reception device also includes a switching device for carrying out the switching between the receptions of the first and the second received signal, the switching device being designed to carry out the switching between the received signals during a time period; the time period being defined in that the information block is transmitted both in the first and the second received signal.

A detection unit is preferably provided for evaluating transmitted information included in the information block of the second received signal, the transmitted information at least stating at which information blocks of the second received signal the information block of the first received signal is being transmitted in an at least partially overlapping manner. The detection unit controls the switching device to carry out a switching between the received signals, while the information block is transmitted in both received signals.

According to an example embodiment, a channel estimate unit is provided to perform a channel estimate at least with the aid of pilot signals contained in the information blocks that are provided in the first and the second received signal.

According example embodiments of the present invention, a transmitting device is provided for transmitting a data stream in a digital transmission system. The data stream in a transmitted signal is transmitted with successive OFDM symbols, in each case, a number of OFDM symbols being combined in one transmission frame; a number of transmission frames being combined in one transmission superframe; the transmission superframe having an information block having one or more OFDM symbols in an established position of the transmission superframe. The transmission device includes a first transmission unit for transmitting a first data stream in a first carrier frequency range and a second transmission unit for transmitting a second data stream in a second carrier frequency range. The first and the second transmission unit are adjusted to each other in such a way that the time durations of the transmission superframes of the first transmitted signal is set to an integer multiple of the time duration of the transmission superframe of the second transmitted signal. Furthermore, a synchronization unit is provided in order to adjust the transmission superframes of the first transmitted signal and the transmission superframes of the second transmitted signal to each other, such that the information blocks of the transmission superframes of the first transmitted signal and at least one of the information blocks of the transmission superframes of the second transmitted signal overlap in time.

A modification unit is preferably provided for adding transmitted information to the information blocks in the second transmitted signal, which states at which information blocks of the second transmitted signal the information block of the first transmission superframe is transmitted simultaneously.

According to example embodiments of the present invention, a pilot signal unit is provided so as to add pilot signals to the first and the second transmitted signal for performing a channel estimate, the density of the pilot signals in the information blocks of the second transmitted signal, compared to the density of the pilot signals that is at least required in order to be able to perform a channel estimate, being increased in the information blocks of the first transmitted signal.

Example embodiments of the present invention are explained in greater detail in light of the attached drawings.

DETAILED DESCRIPTION

Figure 1:
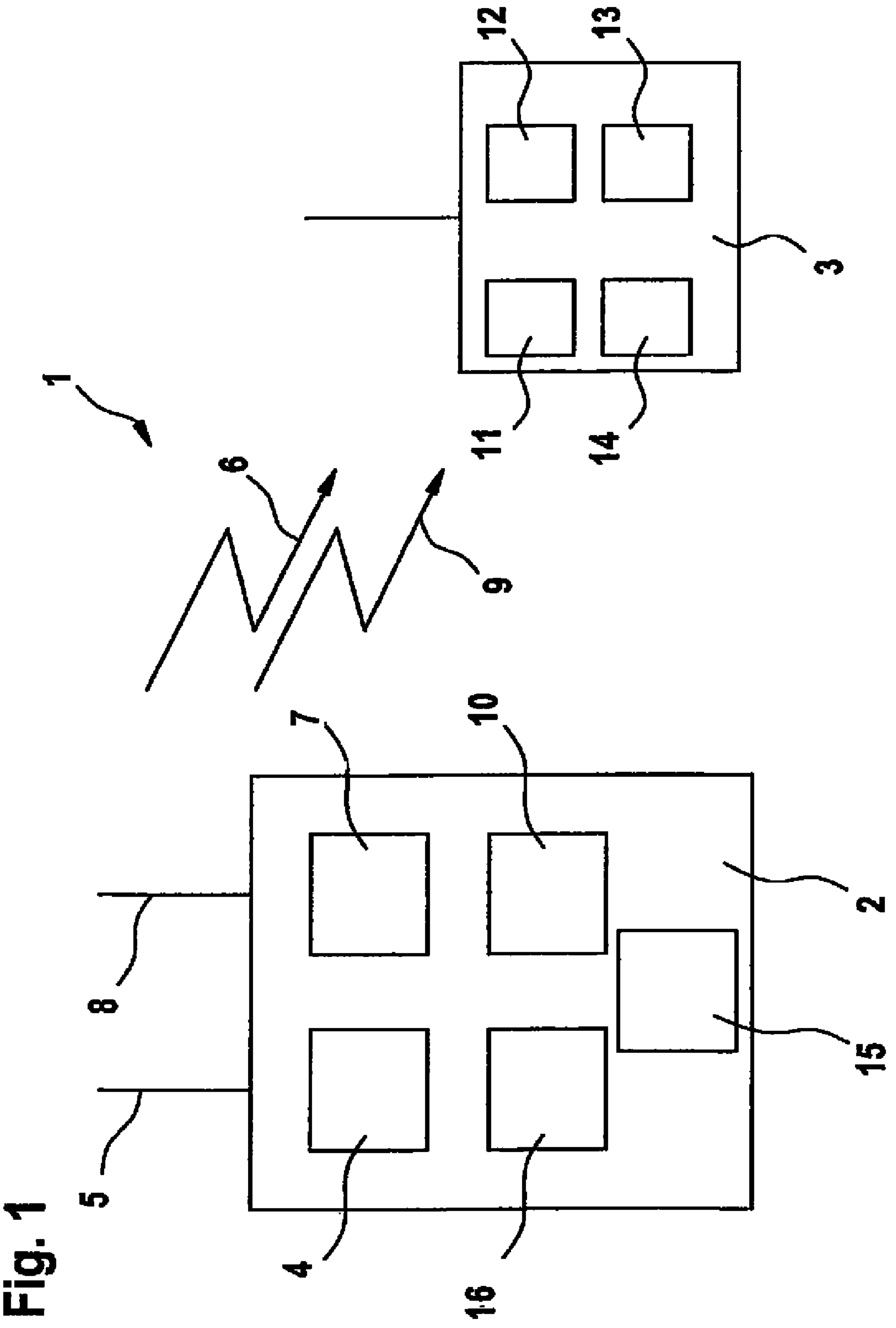
FIG. 1 is a schematic representation of a DRM transmission system having a transmission device and a reception device according to an example embodiment of the present invention.

FIG. 1 shows a DRM transmission system 1 having a transmission device 2 and a reception device 3. The transmission device has a first transmission unit 4, by which a first transmitted signal 6 is emitted via a first antenna 5, in a first carrier frequency range. Moreover, transmission device 2 includes a second transmission unit 7, using which a second transmitted signal 9 is emitted in a second carrier frequency range. The first carrier frequency range is, for instance, in a frequency range for long wave, middle wave and/or short wave. The second carrier frequency is in the VHF band, for example. Transmission units 4, 7 can be built up together, but they may also be present separated from each other in location.

Reception device 3 is arranged in order to receive either the first or the second transmitted signal 6, 9 in the respective carrier frequency range. Reception device 3 is developed in the form of a so-called one receiver reception device, that is, reception device 3 has only one reception unit 11 to receive the first or the second transmitted signal 6, 9, in that reception unit 11 is set to the carrier frequency of the respective transmitted signal.

A DRM transmission system utilizes OFDM (orthogonal frequency division multiplexing) as transmission method. In OFDM, information is transmitted as a data stream in various successive symbols, so-called OFDM symbols, in the respective transmitted signal on a number of subcarrier frequencies, the transmitted signal coding information in an OFDM symbol by a phase relation and an amplitude quantity. The subcarrier frequencies are set as a function of the carrier frequency having certain frequency intervals. In DRM transmission systems the OFDM symbols are transmitted coherently, so that in reception device 3 a channel estimate has to be carried out in which the subcarrier frequencies of the individual symbols are ascertained. This is usually done by embedding pilot signals into the OFDM signal which have a phase and amplitude that is predetermined for the transmission device and the reception device which can be detected by the reception device.

A plurality of OFDM symbols is combined to one transmission frame. Corresponding to the four different transmission modes A, B, C, D described in the standard, the transmission frame includes 15, 15, 20 or 24 OFDM symbols, so that in each case a frame duration of 400 ms comes about.

Figure 2:
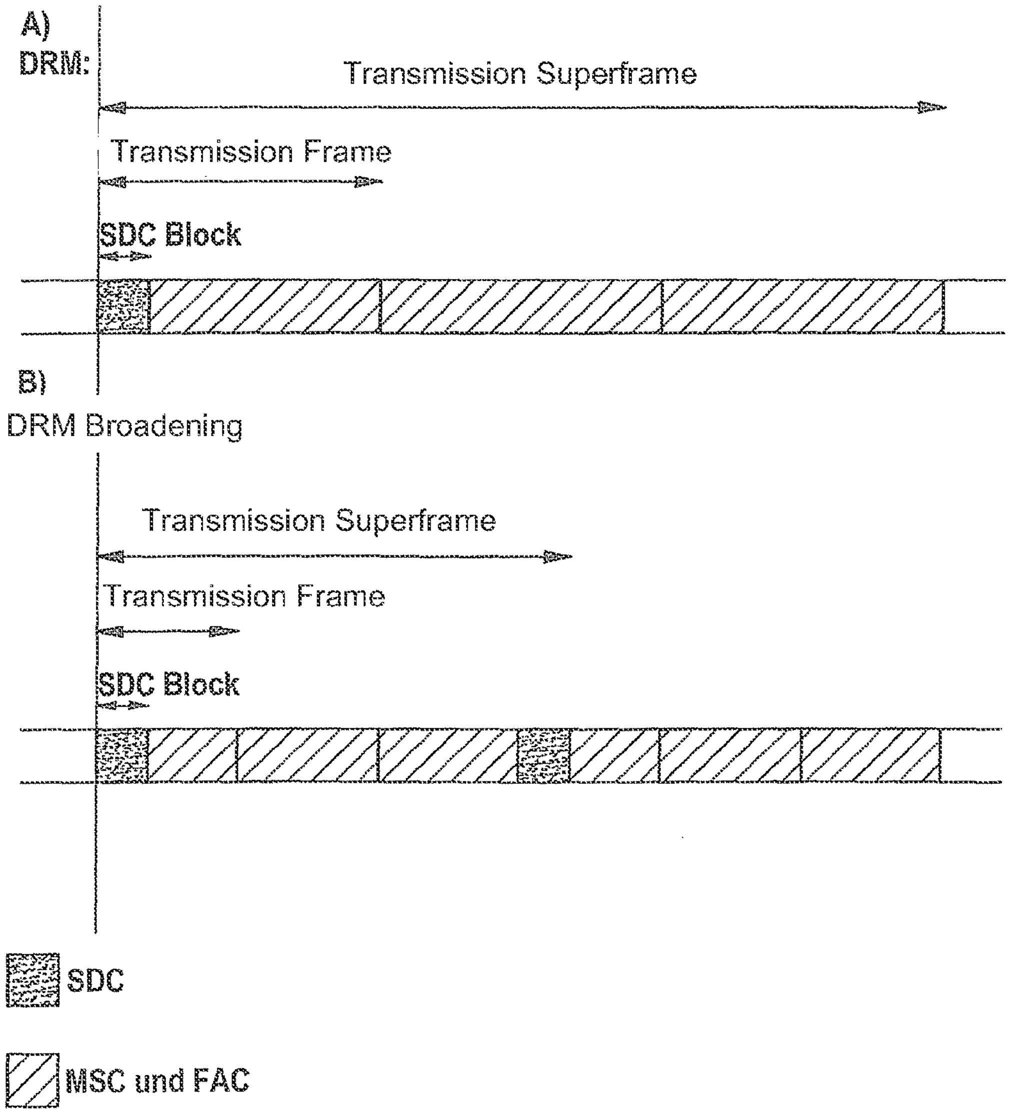
FIGS. 2A and 2B are each a schematic representation of frame structures of DRM transmitted signals in various carrier frequency ranges.

FIG. 2A shows as an example the frame structure of first transmitted signal 6. Three transmission frames are combined to one transmission superframes having a duration of 1200 ms. The first two OFDM symbols in transition mode A and B, or the first three OFDM symbols in transmission mode C and D in a transmission superframe form an SDC block. Each transmission superframe has one SDC block (SDC: service description channel) as information block which contains information on the multiplex structure of the transmitted signal and additional program data, such as the program name. Reception device 3 decodes the SDC block with the necessary data for the reproduction of the audio program. The SDC block is added to each transmission superframe. After the transmission of the SDC block, there follows an MSC block (MSC: main service channel), which includes the actual data of the programs. The FAC block (FAC: fast access channel) includes data for rapidly finding programs during the tuning process such as the service ID.

In this exemplary embodiment, the SDC block is provided as information block at the beginning of each transmission superframe. The data contained therein correspond, since usually the same transmission programs are transmitted in one transmitted signal. Therefore, the reception device can partially suspend the decoding of the SDC block and switch over during the duration of the SDC block to the reception of an additional transmitted signal, for instance, the reception device is able to ascertain the field strength of the second transmitted signal at the alternative second carrier frequency, in this context, and can consequently draw a conclusion as to the signal quality of the second transmitted signal. If second transmitted 6 contains the same data in the SDC block as the first transmitted signal at the receiving frequency, and the two transmission units 4, 7 are synchronized with each other, with the aid of a synchronization unit 15, reception device 3 can determine by correlation methods that second transmitted signal 9 contains the same program at the second carrier frequency, without decoding the SDC block of second transmitted signal 9.

When providing a DMR transmitted signal in an alternative frequency band, such as the VHF band, the DRM system has to be set to a corresponding carrier frequency. That is, the OFDM symbol duration is selected to be different from the OFDM symbol duration that was usual up to now, based on other channel properties. Therefore, for a broadening of the DRM system to an additional carrier frequency band, new OFDM parameters are established. At higher carrier frequencies, for example, the symbol duration is selected to be considerably shorter. As a result, a larger number of OFDM symbols will correspond to a transmission superframe. This is shown in FIG. 2B, the time duration for the transmission of the transmission superframe, in a transmitted signal in the widened frequency band, still is equivalent to only one-half of the time duration of the transmission superframe of the usual frequency band (FIG. 2A).

Transmission device 2 has a synchronization unit 16, which synchronizes the first and the second transmitted signal 6, 9 with each other in such a way that at least one of the SDC blocks (information block) of the second transmitted signal ends synchronously, that is, simultaneously or overlapping in time with the SDC block of the first transmitted signal 6.

For this purpose, the duration of the transmission superframe is selected to be shorter, in order to achieve audio reproduction in the receiver more quickly. Maintaining a number of criteria, in this regard, yields advantages. The length of the transmission superframe should preferably be established by the factor 1/n (n being an integer). For the broadening of the DRM: system, this means a duration of 600 ms, 400 ms, 300 ms, corresponding to n=2, 3, 4, etc. From this, there arises the advantage that, at places at which the first transmitted signal 6 has an SDC block, an SDC block of the second transmitted signal 9 is also sent. This is shown illustratively in FIGS. 2A and 2B by the transmission superframes of first transmitted signal 6 and second transmitted signal 9 shown one above the other, the SDC block of a transmission superframe of first transmitted signal 6 being sent synchronously with an SDC block of one of the transmission superframes of second transmitted signal 9.

Switching over reception device 3 between first and second transmitted signal 6, 9, to utilize an alternative carrier frequency, is thereby facilitated. In addition, the duration of the transmission frames should be abbreviated. The duration should preferably amount to 1/m with respect to the transmission superframe (m being an integer).

Furthermore, it is meaningful to introduce information from a counter or other transmitted information for the transmission superframes, so that, in response to the switching over between second transmitted signal 9 and first transmitted signal 6 the reception device detects at which SDC blocks of the second transmitted signal an SDC block of first transmitted signal 6 is sent at the same time. In the exemplary embodiment shown in FIGS. 2A and 2B, switching over would be possible at every second SDC block, that is, at every second transmission superframe of the second transmitted signal.

The transmitted information, that is, the counter for the SDC blocks, can be added to the SDC block of second transmitted signal 9, for example, by a modification unit 10 provided in transmission device 2. The transmitted information indicates at which SDC blocks of the second transmitted signal the SDC block of the first transmitted signal is sent at least partially overlapping, detection unit 13 activating switching device 12, so that switching is carried out between the transmitted signals when the information block is transmitted in both transmitted signals. In this manner it can be avoided that switching in the transmitted signal leads to an information loss, which can be noticeable in case a broadcast signal is to be received.

Reception device 3 also has a switching device 12 which instructs reception unit 11 to switch from receiving first transmitted signal 6 to receiving second transmitted signal 9, the switching between the reception of transmitted signals 6, 9 being carried out during a time range that is defined by the fact that the SDC block (information block) is transmitted both in the first and in the second transmitted signal. When first transmitted signal 6 is received by reception unit 11, it can be recognized when the SDC block will be sent in the second transmitted signal. If switching to the second carrier frequency is to be performed, the switching device now ascertains that reception unit 11 is to set itself to second transmitted signal 9, so as to demodulate and to decode second transmitted signal 9. A detection unit 13 is provided in order to detect and to evaluate the transmitted information, which is preferably included in the SDC block of the received transmitted signal.

Figure 3:
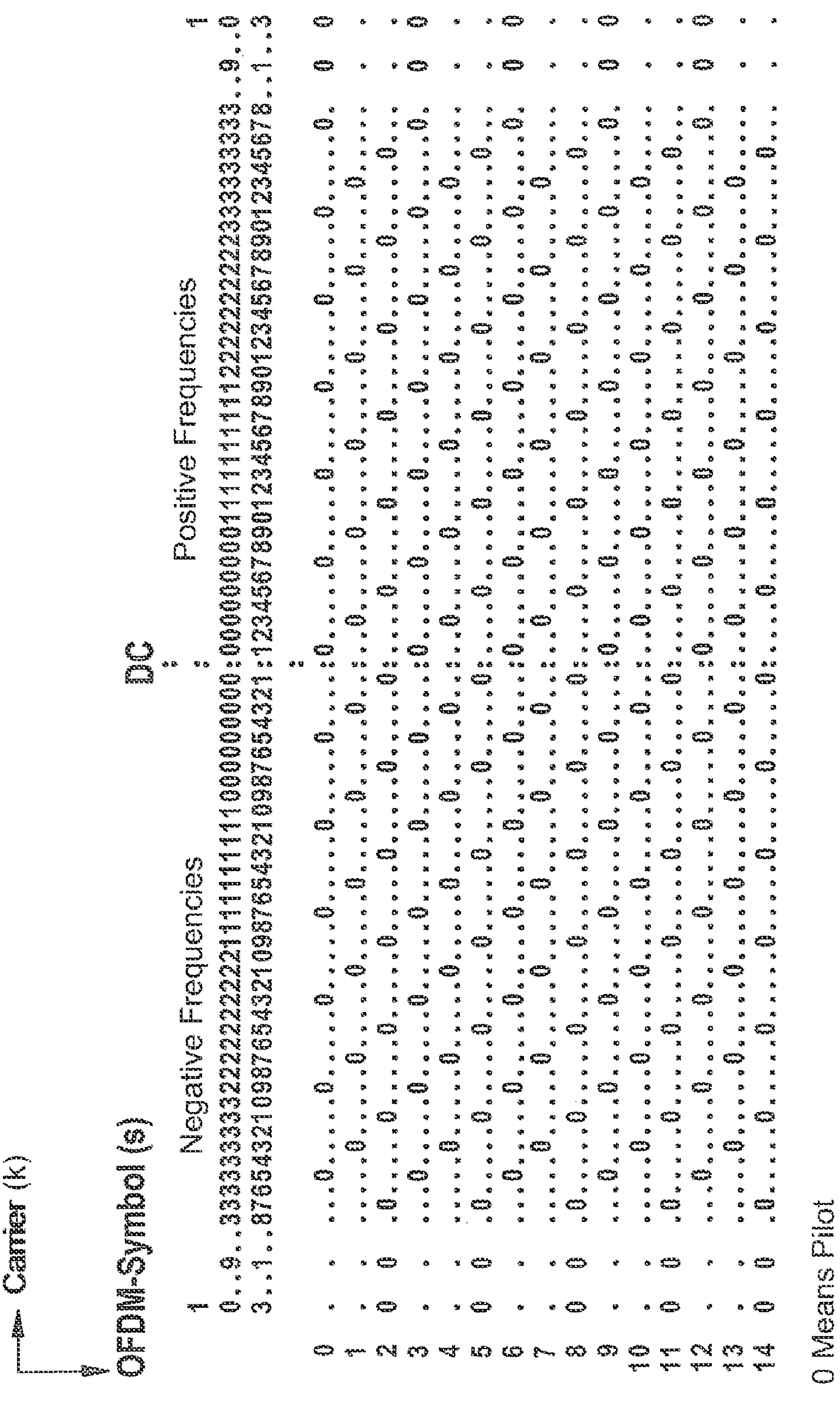
FIG. 3 illustrates the distribution of pilot signals in an OFDM transmitted signal.

When reception is switched between the transmitted signals, there is a need to carry out a new channel estimate, in order to demodulate and decode the transmitted signal to which switching over is taking place. The channel estimate is performed with the aid of a channel estimate unit 14, and is usually made with the aid of pilot signals which are embedded in the OFDM signal at certain time intervals and under frequency intervals. This is shown as an example in FIG. 3 with the aid of the circles (the OFDM symbols are shown as dots). The dots are data cells, that is, subcarriers of an OFDM symbol having useful data. OFDM symbols also correspond to a row of circles and dots in the horizontal direction. A distribution of the pilot signals in the OFDM transmitted signal takes place at regular intervals, both in a direction in time and in the direction of the subcarrier frequencies, which have an established frequency interval, respectively. The channel estimate for the data cells is ascertained by interpolation, in, e.g., a conventional manner. In the channel estimate, one first interpolates in the time direction and then in the frequency direction. In the example, the distance of the interpolation points from the interpolation in the time direction amounts to 3 symbols, and in the subsequent interpolation in the frequency direction it amounts to 2 carriers.

In the OFDM method, the pilot signal density in the frequency direction and in the time direction has to be established during the layout of the system. The pilot signal density in the frequency direction determines the number of pilot signals within the row of OFDM symbols. The pilot signal density in the time direction determines the number of pilot signals at an OFDM subcarrier frequency. The pilot signal density in the frequency direction is specified, during the layout of the system, as a function of the delay spectrum, the line spectrum and the density spectrum that are to be expected, that is, as a function of the multipath propagation conditions of the channel. The pilot signal density in the time direction is specified as a function of the Doppler power density spectrum, that is, as a function of the maximum Doppler frequency of the channel. For a complete channel estimate, an interpolation in the time direction and in the frequency direction have to be carried out. The channel estimate is the basis for carrying out the demodulation of the transmitted signals in the reception device.

Figure 4:
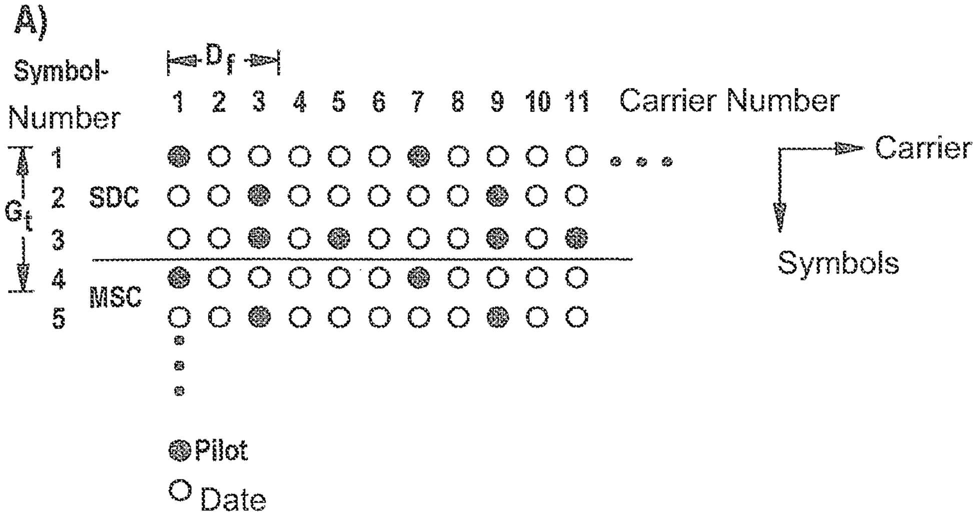
FIGS. 4A and 4B illustrate the distribution of pilot signals in the information blocks of the transmission superframes in the transmitted signals at various carrier frequencies.
Figure 4:
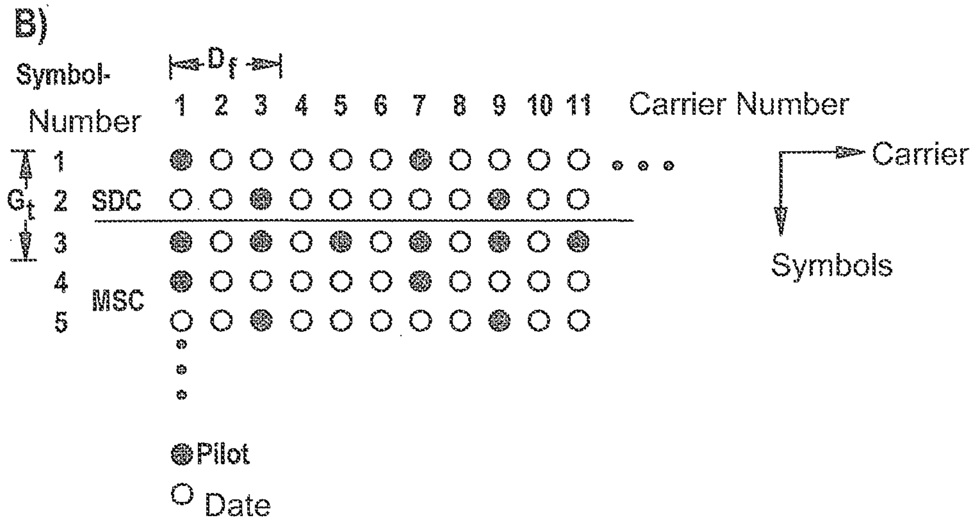

The switching to the reception of another transmitted signal at a different carrier frequency can result in the first OFDM symbol in the SDC block not being recognized, so that one can then also not carry out an interpolation when receiving the subsequent OFDM symbol. In this connection, it is provided, as shown in FIGS. 4A and 4B, that a greater pilot signal density should be provided for the symbols within the SDC block and/or in the first MSC symbols. FIG. 4A shows an SDC block have three consecutive symbol rows, in which additional pilot signals are introduced. In FIGS. 4A and 4B, pilot signals are shown as solid circles and data cells as plain circles.

It can be seen in FIGS. 4A and 4B that in the diagonal pilot signal pattern used, $X_t = G_t + D_f + 1$ ($G_t$ being the distance apart of the pilot signals in the time direction; $D_f$ being the distance apart of the pilot signals in the frequency direction), OFDM symbols are required in order to achieve a complete channel estimate. From the example in FIGS. 4A and 4B one obtains $X_t = 6$.

It is provided that one should use additional pilot signals in individual OFDM symbols. The objective is to achieve a complete channel estimate within a short period of time, that is, using fewer OFDM symbols. In the case of switching to an alternative (higher) carrier frequency, the assumption is made, in the examples of FIGS. 4A and 4B, that OFDM symbol No. 3 is the first symbol to be received. The first two symbols cannot be decoded, based on different propagation times of the signals of the carrier frequency of the first transmitted signal and of the carrier frequency of the second transmitted signal. In addition, the PLL (phase locked loop) provided in the reception device requires a certain time for the frequency conversion. In the pilot distribution of FIG. 4A only five OFDM symbols are required and in the pilot distribution of FIG. 4B only four OFDM symbols are required to achieve a complete channel estimate if, in each case, the symbol $N_{START} = 3$ is the first symbol to be received. The additional pilots are added according to one of the following rules:

- additional pilots are added to the last OFDM symbol in the SDC block (in this case symbol No. 3) on each $G_t$ subcarrier (in this case $G_f = 2$) which has no pilots in OFDM symbol $N_{start}$ (in this case symbol No. 3) or $N_{start}+1$ (in this case symbol No. 4). Thus, the additional pilots in the example are added in OFDM symbol No. 3 on each $G_f * D_t$ subcarrier (in this case on subcarriers No. 3, 9, 15, . . . ).
- additional pilots are added to the first OFDM symbol of the MSC (in this case symbol No. 4) on each $G_f$ subcarrier (in this case $G_f = 2$) which has no pilots in OFDM symbol $N_{start}$ (in this case symbol No. 3). Thus, the additional pilots in the example are added in OFDM symbol No. 4 (in this case on subcarriers No. 1, 3, 7, 9, . . . ).

In this manner it is ensured that the channel estimate can be undertaken as quickly as possible after switching to the alternative carrier frequency.

In general, additional pilots are inserted on some subcarriers of the first symbol to be decoded of the further transmitted signal. This is necessary both when switching to the transmitted signal of the alternative carrier frequency and when switching back to the transmitted signal of the original carrier frequency. The additional pilot signals have to be distributed in such a way that no data cell is transmitted at a subcarrier frequency before a pilot signal has been received in such a way that at least the subcarrier frequency is ascertainable by interpolation.

The modified pilot signal pattern has to be known to reception device 3. Additional interpolation filters are preferably provided in reception device 3 so as to interpolate the received transmitted signal in the time direction. In the example shown, $D_t = 3$. However, in FIGS. 4A and 4B pilot clearances of $D_t = 2$ come about on some carriers.

What is claimed is:

1. A method for transmitting a data stream in a digital transmission system, comprising:

- transmitting the data stream in a transmitted signal using successive OFDM symbols;
- combining a number of OFDM symbols in a transmission frame;
- transmitting a number of transmission frames in one transmission superframe, each transmission superframe having an information block having at least one OFDM symbol in an established position of the transmission superframe;
- transmitting a first transmitted signal having a first data stream in a first carrier frequency range and a second transmitted signal having a second data stream having the same information content as the first data stream in a second carrier frequency range;

wherein a time duration of the one transmission superframe of the first transmitted signal is an integer multiple of a time duration of the one transmission superframe of the second transmitted signal.

2. the method according to claim 1, wherein one of information blocks in the transmission superframes of the first transmitted signal is transmitted at least one of (a) at least partially overlapping in time with and (b) at the same time with one of the information blocks of the transmission superframe of the second transmitted signal.

3. the method according to claim 1, wherein the time duration of the one transmission superframe of the first transmitted signal is a further integer multiple of the time duration of the one transmission superframe of the second transmitted signal.

4. the method according to claim 1, wherein a transmitted information is added to each information block of the transmission superframes of the second transmitted signal, wherein the transmitted information states at which information block of the second transmitted signal an information block of the first transmitted signal is sent overlapping in time.

5. the method according to claim 1, wherein the second carrier frequency is higher than the first carrier frequency, wherein pilot signals are provided in the transmission superframes of the first and the second transmitted signal, to support a channel estimate, wherein, for carrying out the channel estimate, certain densities of the pilot signals are required in the second transmitted signals in the transmission superframes, as a function of channel properties of the transmitted signals, wherein a density of the pilot signals of the second transmitted signals is selected to be greater compared to the determined density of the pilot signal of the second transmitted signal.

6. A method for switching reception between two received signals including OFDM symbols, comprising:

combining a number of OFDM symbols in a transmission frame;

transmitting a number of transmission frames in one transmission superframe, each transmission superframe having an information block having at least one OFDM symbol at an established position of the transmission superframe; and switching between reception of a first of the received signals and reception of a second of the received signals during a time period in which an information block is transmitted both in the first and in the second received signal, wherein a transmitted information is received in the information blocks of the second received signal which states with which information blocks of the second transmission superframe the information block of the first transmission superframe is transmitted simultaneously.

7. A method for switching reception between two received signals including OFDM symbols, comprising:

combining a number of OFDM symbols in a transmission frame;

transmitting a number of transmission frames in one transmission superframe, each transmission superframe having an information block having at least one OFDM symbol at an established position of the transmission superframe; and switching between reception of a first of the received signals and reception of a second of the received signals during a time period in which an information block is transmitted both in the first and in the second received signal, wherein, directly after the switching between the received signals, a channel estimate is carried out with the aid of pilot signals including information blocks that are provided in the first and in the second received signal.

8. A reception device in a digital transmission system for receiving a received signal, comprising:

a reception unit configured to receive a first received signal in a first carrier frequency range and a second received signal in a second carrier frequency range, the received signals including OFDM symbols, in each case, a number of OFDM symbols combined in one transmission frame, a number of transmission frames are included in one transmission superframe, each transmission superframe having an information block having at least one OFDM symbol in an established position of the transmission superframe; and a switching device configured to carry out a switching between reception of the first and the second received signal, the switching device configured to carry out the switching between the received signals during a time period defined in that an information block is transmitted both in the first and in the second received signal, a detection unit configured to evaluate transmitted information included in the information block of the second received signal, the transmitted information at least states at which information blocks of the second received signal the information block of the first received signal is transmitted in an at least partially overlapping manner, the detection unit adapted to control the switching device to carry out a switching between the received signals, while the information block is transmitted in both received signals.

9. The reception device according to claim 8, further comprising a channel estimate unit configured to perform a channel estimate at least with the aid of pilot signals included in the information blocks that are provided in the first and the second received signal.

10. A transmitting device for transmitting a data stream in a digital transmission system, the data stream transmitted in a transmitted signal using successive OFDM symbols, in each case, a number of OFDM symbols combined in one transmission frame, a number of transmission frames combined in one transmission superframe, the transmission superframe having an information block having at least one OFDM symbol in an established position of the transmission superframe, comprising:

a first transmitting unit configured to transmit a first data stream in a first carrier frequency range;

a second transmitting unit configured to transmit a second data stream in a second carrier frequency range, the first and the second transmission unit adjusted to each other such that a time duration of the transmission superframe of the first transmitted signal is set to an integer multiple of a time duration of the transmission superframe of the second transmitted signal; and a synchronization unit configured to adjust the transmission superframes of the first transmitted signal and the transmission superframes of the second transmitted signal to each other such that the information blocks of the transmission superframes of the first transmitted signal and at least one of the information blocks of the transmission superframes of the second transmitted signal overlap in time.

11. The transmitting device according to claim 10, further comprising a modification unit configured to add transmitted information to the information blocks in the second transmitted signal, which states at which information blocks of the second transmitted signal the information block of the first transmitted signal is transmitted simultaneously.

12. The transmitting device according to claim 10, further comprising a pilot signal unit configured to add pilot signals to the first and the second transmitted signal for carrying out a channel estimate;

wherein, for carrying out the channel estimate, certain densities of the pilot signals are required in the information blocks of the transmitted signals in the transmission superframes, as a function of channel properties of the transmitted signals;

wherein the pilot signal unit is configured to add additional pilot signals into the second transmitted signal.

* * * * *